United States Patent
Malkin et al.

(10) Patent No.: US 9,141,942 B2
(45) Date of Patent: Sep. 22, 2015

(54) EVENT SCHEDULER BASED ON REAL-TIME ANALYTICS AND BUSINESS RULES

(75) Inventors: Peter K. Malkin, Hawthorne, NY (US); Jacquelyn A. Martino, Cold Spring, NY (US); Paul M. Matchen, Bethel, CT (US); Patrick Wagstrom, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/603,855

(22) Filed: Sep. 5, 2012

(65) Prior Publication Data

US 2014/0067449 A1    Mar. 6, 2014

(51) Int. Cl.
G06Q 10/00 (2012.01)
G06Q 10/10 (2012.01)
G06Q 10/06 (2012.01)

(52) U.S. Cl.
CPC ...... *G06Q 10/109* (2013.01); *G06Q 10/063114* (2013.01)

(58) Field of Classification Search
CPC .............................................. G06Q 10/063114
USPC ................................. 705/7.11–7.42
See application file for complete search history.

(56) References Cited

U.S. PATENT DOCUMENTS

| | | | |
|---|---|---|---|
| 5,764,953 A | 6/1998 | Collins et al. | |
| 7,734,783 B1 | 6/2010 | Bourke et al. | |
| 7,938,727 B1 | 5/2011 | Konkle | |
| 2005/0033615 A1* | 2/2005 | Nguyen et al. | 705/5 |
| 2005/0165891 A1 | 7/2005 | Moody et al. | |
| 2008/0086363 A1 | 4/2008 | Kass et al. | |
| 2008/0130860 A1 | 6/2008 | Mullis et al. | |
| 2009/0150507 A1 | 6/2009 | Davis et al. | |
| 2009/0171780 A1 | 7/2009 | Aldrey et al. | |
| 2009/0276317 A1* | 11/2009 | Dixon et al. | 705/14.61 |
| 2009/0327437 A1 | 12/2009 | Estrada | |
| 2010/0002859 A1 | 1/2010 | Hepworth et al. | |
| 2010/0161683 A1 | 6/2010 | Leeds et al. | |
| 2010/0185933 A1 | 7/2010 | Coffman et al. | |
| 2010/0241498 A1 | 9/2010 | Chung et al. | |
| 2010/0324929 A1 | 12/2010 | Petrasich et al. | |
| 2011/0161167 A1* | 6/2011 | Jallapuram | 705/14.49 |
| 2011/0178820 A1 | 7/2011 | Soni et al. | |
| 2011/0231240 A1 | 9/2011 | Schoen et al. | |
| 2011/0258125 A1 | 10/2011 | Iyer | |

(Continued)

OTHER PUBLICATIONS

Chipaila, "Mining Data in the Context of Semi-Structured Business Processes", Technische Univeresiteit Eindhoven, Department of Mathematics and Computer Science, Dec. 2007.

(Continued)

*Primary Examiner* — Sujay Koneru
(74) *Attorney, Agent, or Firm* — Scully, Scott, Murphy & Presser, P.C.; Louis J. Percello, Esq.

(57) ABSTRACT

Scheduling a given event, in one aspect, may include obtaining a set of one or more business rules, obtaining analytics, and obtaining an event specification. The event specification may include at least one content specification and two or more transmission modes. The event may be scheduled based on the event specification, the analytics and the business rules. The scheduling may be indicated by a tuple comprising event content, one or more communication modes selected from the two or more transmission modes, and timing of the scheduled event.

16 Claims, 3 Drawing Sheets

(56) References Cited

U.S. PATENT DOCUMENTS

| | | | |
|---|---|---|---|
| 2011/0289149 | A1 | 11/2011 | Shmueli et al. |
| 2011/0302227 | A1 | 12/2011 | Jones, III |
| 2011/0314048 | A1 | 12/2011 | Ickman et al. |
| 2012/0079399 | A1* | 3/2012 | Ferman et al. ............... 715/753 |
| 2012/0215597 | A1 | 8/2012 | Ross |
| 2012/0323991 | A1* | 12/2012 | Wang et al. ................. 709/203 |
| 2013/0052940 | A1* | 2/2013 | Brillhart et al. ............. 455/3.06 |

OTHER PUBLICATIONS

Nguyen et al., "Sense & Response Service Architecture (SARESA): An Approach towards a Real-time Business Intelligence Solution and its use for a Fraud Detection Application," DOLAP'05, Nov. 4-5, 2005, Bremen, Germany.

Park et al., "An Integrated Approach to Process-Driven Business Performance Monitoring and Analysis for Real-Time Enterprises," C. Bussler et al. (Eds.): BIRTE 2006, LNCS 4365, pp. 133-142, 2007. Springer-Verlag.

Office Action dated Jul. 21, 2014 received in U.S. Appl. No. 13/612,131.

U.S. Office Action mailed May 24, 2013 in related U.S. Appl. No. 13/612,131.

U.S. Office Action mailed Feb. 12, 2013 in related U.S. Appl. No. 13/612,131.

Office Action dated Oct. 30, 2014 received in U.S. Appl. No. 13/612,131.

* cited by examiner

EVENT SCHEDULER BASED ON REAL-TIME ANALYTICS AND BUSINESS RULES

FIELD

The present application relates generally to computers, and computer applications, and more particularly to scheduling of events based on real-time analytics and rules.

BACKGROUND

Methodologies exist that generally manage collecting of data and scheduling of events. Other known methodologies target advertisements for types of targeted consumer devices. Yet other methodologies exist for predicting outcomes, e.g., related to the payment of the healthcare patient account. Still other methodologies integrate active and simulated decision making process.

BRIEF SUMMARY

A method of scheduling a given event, in one aspect, may comprise obtaining a set of one or more business rules associated with an event. The method may also comprise obtaining analytics associated with the event. The method may further comprise obtaining an event specification associated with the event, the event specification comprising at least one content specification and two or more transmission modes. The method may further comprise scheduling the event based on the event specification, the analytics and the business rules. The scheduling may be indicated by a tuple comprising event content, one or more communication modes selected from the two or more transmission modes, and timing of the scheduled event.

A method of scheduling a given event, in another aspect, may comprise obtaining a set of one or more business rules associated with an event. The method may further comprise obtaining analytics associated with the event, the analytics comprising initially communications modes and timing of the event determined from a profile of a target recipient, the analytics further comprising real-time analytics computed based on dynamically monitored behavior of the target recipient. The method may further comprise scheduling the event based on the one or more business rules and at least the real-time analytics. The scheduling of the event may further comprise modifying the initial communications modes and timing of the event based on the one or more business rules and at least the real-time analytics.

A method of scheduling a given event, in yet another aspect, may comprise obtaining a set of one or more business rules associated with an event. The method may further comprise obtaining initial analytics associated with the event, the initially analytics comprising initially communications modes and timing of the event determined from a profile of a target recipient. The method may also comprise monitoring behavior of the target recipient. The method may further comprise updating the initial analytics to generate real-time analytics based on the monitored behavior of the target recipient. The method may further comprise scheduling the event based on the one or more business rules and at least the real-time analytics.

A system for scheduling a given event, in one aspect, may comprise an event scheduler operable to execute on a processor, the event scheduler further operable to obtain a set of one or more business rules associated with an event, obtain analytics associated with the event, obtain an event specification associated with the event. The event specification may include at least one content specification and two or more transmission modes. The event scheduler may be further operable to compute a schedule of the event based on the event specification, the analytics and the business rules. The schedule may be indicated by a tuple comprising event content, one or more communication modes selected from the two or more transmission modes, and timing of the scheduled event.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

An event scheduler that schedules one or more events based on real-time analytics and business rules may be provided. An event scheduler of the present disclosure may optimize the timing and scheduling of events based on real-time analytics and dynamic business rules. For instance, a user may propose an event or a collection of events. The event scheduler of the present disclosure may reference a dynamic set of business rules and collect real-time analytics for the proposed event's target user-base relevant to the proposed event based on its characteristics and properties. The event scheduler of the present disclosure may optimize the deployment of the event contents and schedule a new event, possibly multiple times, within the context of an existing event schedule. The scheduling in the present disclosure in one embodiment may consider the combinations of event collections, real-time analytics on stakeholder's characteristics and event characteristics, and event deployment/scheduling optimization. The event scheduler of the present disclosure in one embodiment may provide for adaptive, possibly repeated, scheduling and updating, including segmentation of a particular event and repeated execution of the event, based on analytics and business rules.

Figure 1A:
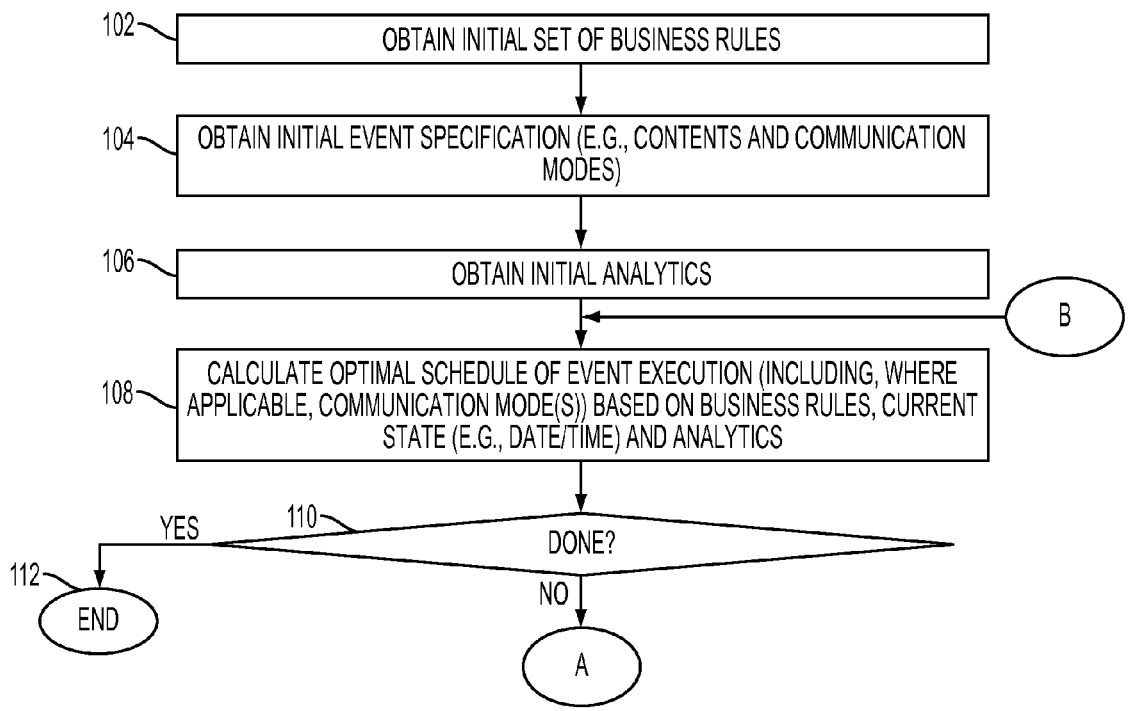
FIGS. 1A and 1B show a flow diagram illustrating a method of scheduling an event according to an embodiment of the present disclosure.
Figure 1B:
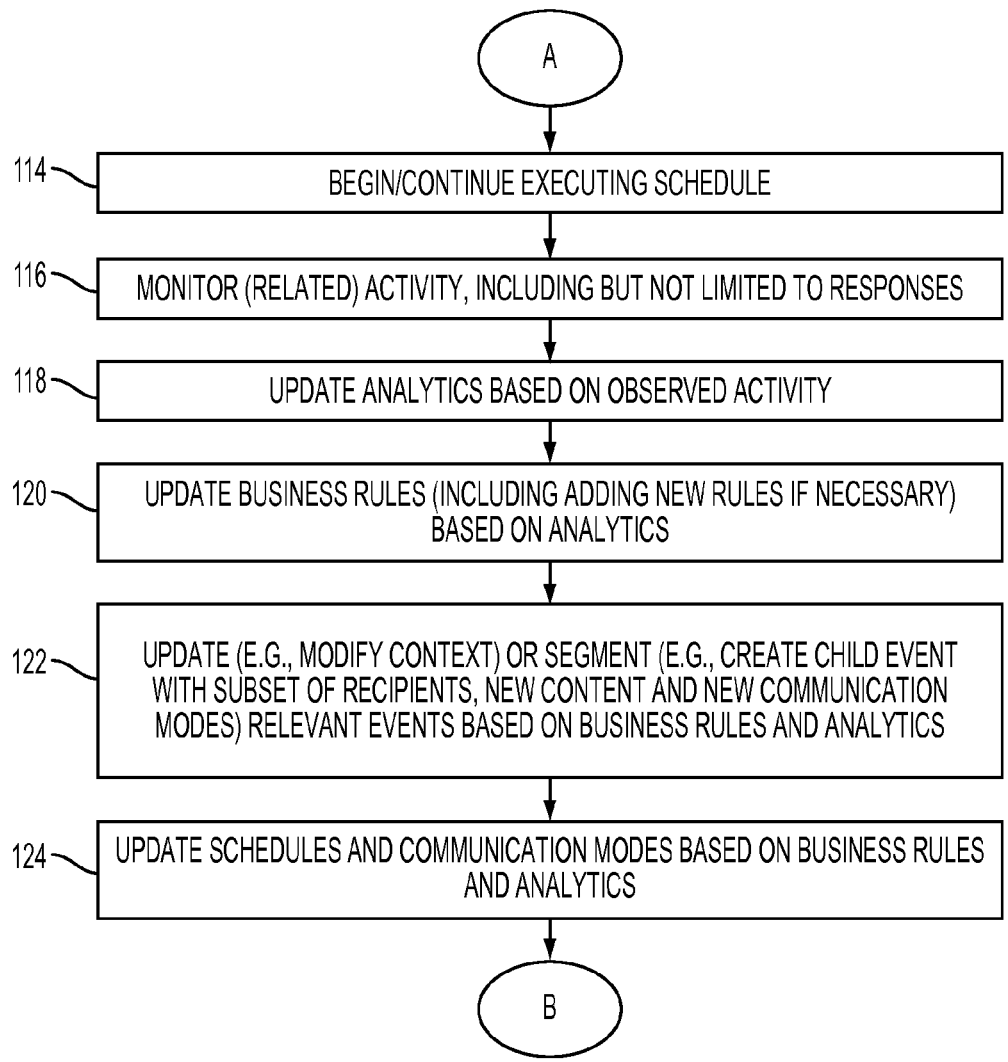

FIGS. 1A and 1B show a flow diagram illustrating a method of scheduling an event according to an embodiment of the present disclosure. At 102, an initial set of one or more business rules are obtained, where a business rule is referred to as a statement or a set of statements that define, describe, or constrain an aspect of the business for the purpose of controlling or otherwise influencing the business, its customers, or associates. For example, a business rule may be "If a customer has a repeated history of paying off loans on time then give that customer a lower interest rate on future loans." Business rules may be retrieved from a database or the like that may store such rules. Business rules may be also obtained by receiving a user input, which the user may have entered, e.g., via a computer user interface tool or the like. Business Domain Specialists may enter rules based on their understanding of the organization's goals and strategies. Additionally, a user may specify a desired outcome, e.g., "offer better loan rates," and a methodology of the present disclosure may automatically search against the rules database to find all rules where "offer better loan rates" is the right hand side of the rule. The method of the present disclosure may progress using all results or a sub-set as specified by the user and/or other business objectives already systematically defined.

At 104, initial event specification is obtained. The event specification in one embodiment includes at least one content specification and two or more transmission modes. For example, the event specification may specify the content of the event and communication modes as transmission modes. The content, for instance, may describe the type of the event, the event itself, and/or other information associated with the content. The transmission or communication modes may specify how the event content is to be communicated, e.g., via email, posting on a web page, tweet™, posting on a social networking site, posting on a blog site, and others. Event specification may be retrieved from a database or the like that may store such specifications. Event specification may be also obtained by receiving a user input, which the user may have entered, e.g., via a computer user interface tool or the like. Information about the modes of communication may be inferred from or associated with customer profiles (e.g., smartphone users, users without computers, etc). This information may be stored in a centralized customer relation management (CRM) system or obtained from third party marketing agencies that collect such information.

At 106, initial analytics is obtained. Initial analytics may include modes and timing of communication according to profile data of the recipients of the communication and initial content determined or decided on by a heuristic. Consider the following example event. An automobile corporation wishes to advertise its new models as part of a campaign surrounding a sport event. The corporation knows that it has an automobile model that will appeal to an age group (target market). Further, research has shown that the target age group utilizes or is on a first social networking website for a number of hours periodically (e.g., 1.5 hours a day). However, the corporation also knows that during certain hours (e.g., the hours of 10 AM-12 AM), there is little social networking activity on that first site, so during that period of time the corporation chooses to use short messaging service (SMS) or another second social networking or microblogging site to reach that target age group for sending the communication related to the event, i.e., advertising of the new automobile model in this example (the first and second social networking sites, SMS, microblogging site are modes of communication obtained from market research on the target market). The appropriate timing of the events can be obtained through data analysis from previous similar events or computational models of human behavior.

At 108, a schedule of event execution is computed. The computed schedule in one embodiment of the present disclosure is optimal, e.g., in that, event execution is scheduled where it is applicable and by one or more optimal communication modes that are determined to be optimal based on the business or other rules, current state or real time factors (e.g., date and time), and the analytics. The scheduling may be indicated as a tuple comprising event content, communication mode and timing of the scheduled event. The timing of the scheduled event, e.g., may be indicated as time and date, duration of period, start and stop time, and/or in another manner.

The schedule may be computed based on observations of past event success and response rates. For example, calling between 7 PM and 9 PM on weeknights may result in more success in reaching a desired target than calling earlier because people may be enjoying dinner. Likewise, sending an email at 2 AM may have poor response rate, but sending an email at 8 AM may have a better response because the user should see it at the top of their mailbox. This information can currently be obtained by market research and as the methodology is used, a database may be built to include findings of each user's success rates (e.g. A/B testing of a campaign varying only by the time of day the messages are sent, which compares control data to other data).

At 110, if the event has been scheduled and executed, the logic ends at 112. Otherwise at 114, the execution of the computed schedule begins and/or continues, i.e., the computed schedule is sent according to the determined one or more communication modes.

At 116, as the schedule is executed, related activities that occur are monitored. Examples of related activities may include, but are not limited to, user activities and responses. User activities may include actions such as replicating the original message to a user's own network or posting a commentary. Responses may include communications that go directly from a user back to a system implementing a methodology of the present disclosure—responses may be public or private. Monitoring may involve a system for real time capture, parsing, and analytics through the variety of communication streams used by the original communication. For example, it is possible to get a real-time feed of all events from a social networking or blogging site, and see how users are replicating the original message through their networks. A methodology of the present disclosure may also perform sentiment analysis on the responses to the message.

At 118, the analytics may be updated based on the monitored or observed activities during the schedule's execution. The analytics may be also updated based on observed activities before and/or after the schedule's execution.

At 120, the business rules may be updated based on the analytics. An analytic may provide an analysis of an event and response behavior of target audience surrounding the event, for instance, as described in the above automobile corporation example. A way in which a rule may be updated is by the observation that the age group has a lower than expected response to the message when distributed via one communication mode (e.g., the first social networking site), in which case, the methodology of the present disclosure may prioritize other communications mediums in future communications (e.g., to new recipients of the event or in repeat communications to prior recipients). In addition, the business rules may be updated based on user input, e.g., input of a new rule or modification of an existing rule.

At 122, the scheduled event may be updated based on the business rules and/or analytics. The methodology of the present disclosure in one embodiment utilizes the updated business rules to retarget communications related to the event, e.g., by changing time of deliver, communication medium, etc. Updating of the events may include, but is not limited to, modifying the content of the event, modifying or adding a mode of communication, segmenting an event, e.g., creating new events or spawning child event whose content and communication mode is based on the current (or parent) event. As an example, consider an event that comprises a blogging or posting on a social networking site regarding an item X with attribute Y. It may be observed that the posting is widely followed in country A, but ignored in country B. A new child event may be spawned where the content of the posting regarding item X is changed to include attribute Z instead. Further, the communication mode may be modified to country B-accessible web page or the like. In another embodiment, the content of the newly created or spawned child event may include a segment of the content of the parent event. Likewise, the communication mode of the newly created or spawned child event may include a subset of the parent event's communication mode. In addition, the child event may be targeted to a subset of possible end-recipients of the parent event.

At 124, the schedule and communication mode may be updated based on the updated business rules and analytics. The logic may continue to 108, and repeat the steps to provide analytic and rule based event updating and scheduling, e.g., dynamically on a real-time basis.

A scheduler system (also referred to as an event scheduler) and a methodology thereof in one embodiment of the present disclosure, utilize adaptive and dynamic criterion or criteria in planning a schedule for a given event. The criterion may be influenced by the aggregate of the participants in the event, external stimuli, and the weights of these influencing factors may be varied in generating the schedule. In one embodiment, business analytics may be used in situ rather than simply post-hoc. Adaptive business strategies that are responsive to the actions of participants (e.g., individual and/or aggregate) and external stimuli may be utilized. In the present disclosure, an event may broadly include, but not limited to, message triggers, collections of message triggers, sequences of events and their relations between and among one another, a meeting, and others. The scheduler system and the methodology thereof in one embodiment may respond to not only real-time events but also threshold events based on aggregate actions across population. In one embodiment of the present disclosure, user-proposed events and system-proposed events may be differentiated affording the user the ability to influence the scheduling and delivery mode of single event and collections of events.

As an example of an event, consider a marketing campaign that would include posting of messages on a social networking or blogging site such as Twitter™. A user may queue a plurality of such messages in a proposed schedule and business rules may be input, for example, at the marketing level or by the user or both. The event scheduler of the present disclosure may collect data and perform analytics on saturation (reach), geography, and other factors. Input sources, for example, news feeds such as RSS or syndication of web content feeds identified by the user or the like may be considered in the analytics. Based on the output of the analytics and business rules, the queued up messages or tweets may be confirmed and made live for their currently scheduled time, or put on "hold" until the analytics output in combination of business rules confirm that it is a good time for the tweet to go live. The event scheduler may also recommend for edit of the event content, based on the analytics and business rules.

As another example, an event may be a schedule related to presentation at a conference (e.g. a major technology conference, trade fair, or expo, or the like, where many firms are announcing new products). The conference may have scheduled notices for presentations or other gatherings to be delivered as a reminder, for example, at a predetermined time (e.g., 30 minutes) before each event. Each track in the conference could have a separate feed so attendees could "subscribe" to the notices they care about. In the context of this conference, attendees have RFID tags on their badges and conference organizers have access to real time information about attendees of different sessions. After the first session, the organizers may see that track B in the conference has lower attendance than expected and they may switch to a more prominent communication medium (e.g., automated calls to cell phones). Also, because there is real time information about attendee location, the organizers can send out multiple variations of a message and see immediately which messages have a higher impact and choose to use those messages for subsequent notices of sessions.

In yet another example—one that is fully automated, i.e., not requiring any human input—a support system may schedule service calls based on severity and time zone. If a server goes down, one or more rules may determine the level of support that the outage warrants. Perhaps a minor server will notify local support personnel at the beginning of the work day. A high availability server, on the other hand, may warrant immediate notification via multiple modalities (e.g. pager, IM, phone call, email, etc.) and escalate if the problem persists, according to the associated business rules. On the weekend or off-hours, different schedules could be specified than during normal working hours, according to each user's individual preferences and responsibilities. Using the method of the present disclosure in one embodiment, the least intrusive notification methods could be initially specified (e.g. email, instant messaging) and then if the problem does not get addressed, the notification methods may be escalated to more intrusive methods (e.g., a phone call). The methodology of the present disclosure may then update the business rules based on responses and change communications medium.

Still yet as another example, news of a dynamic, but scheduled, event may be queued and released as milestones occur. For example, a high publicity wedding may have been planned with a fixed agenda, but exact times might not have been guaranteed. Real time analytics may include the occurrence of the arrival of the motorcade at location of the wedding, the arrival of the public figures, etc. that may trigger the scheduled event. Queued messages may include additional background material, such as historical information about location of the wedding, or other information that could have been prepared beforehand, and need not be written at the actual time of the event.

The event scheduler of the present disclosure in one embodiment may process and redirect events based on the state or change of state of the process at a point in time. For example, a project has a process such as software development, where the development moves from one state or phase to another based on a metric that is mapped into the system. For example, a user may check in source code for an integration build that results in the code base cleanly compiling on all platforms and passing a large set of unit tests. When this metric passes there is an existing set of alerts that were queued to be sent out by the system. Based on the change of state of the process, these messages are redirected and possibly rescheduled by a methodology of the present disclosure in one embodiment. In addition, the methodology of the present disclosure may send the notification to appropriate new individuals.

Figure 2:
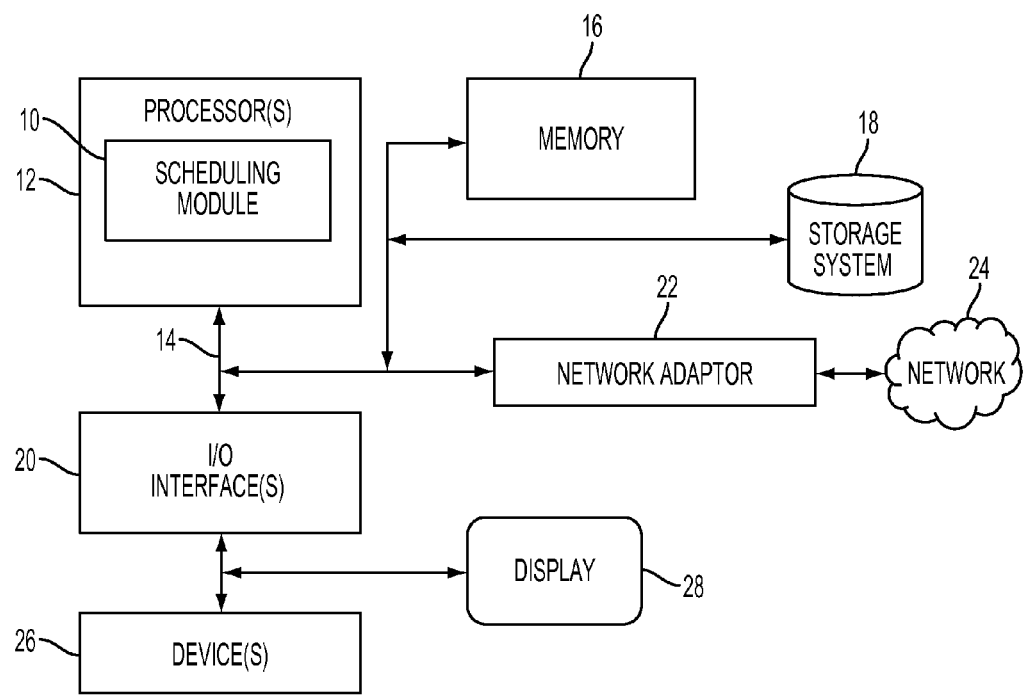
FIG. 2 illustrates a schematic of an example computer or processing system that may implement an event scheduling system of the present disclosure in one embodiment.

FIG. 2 illustrates a schematic of an example computer or processing system that may implement the event scheduling system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a scheduling module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of scheduling a given event, comprising:
   obtaining a set of one or more business rules associated with an event;

obtaining analytics associated with the event;
obtaining an event specification associated with the event, the event specification including at least one content specification and two or more transmission modes;
deploying the event, by a processor, based on at least the event specification, the analytics and the business rules, and the two or more transmission modes that comprise at least two or more of electronic mail, posting on a web page, posting on a social networking site, or posting on a blogging site,
the deploying based on a tuple comprising event content, one or more communication modes selected from the two or more transmission modes, and timing of the event; and
updating the analytics based on the deploying,
wherein the deploying the event comprises a support computer system automatically deploying a support of level that a computer outage warrants, based on severity and time zone determined by the analytics and the business rules, and wherein based on the analytics that is updated, escalating the one or more communication modes to an intrusive mode,
wherein the deploying the event further comprises redirecting the event based on a state or a change in a state of a source code development and integration process at a plurality of platforms, at a point in time.

2. The method of claim 1, further including:
updating the analytics based on a user activity occurring before the deploying of the event, during the deploying of the event, or after the deploying of the event, or combinations thereof.

3. The method of claim 1, further including:
updating the business rules based on the analytics.

4. The method of claim 1, further including:
updating the business rules based on user input.

5. The method of claim 1, wherein the event specification includes description of the event content and description of the communication mode.

6. The method of claim 1, further including:
updating the event specification based on the business rules and the analytics.

7. The method of claim 6, wherein the updating the event specification includes modifying the content specification.

8. The method of claim 6, wherein the updating the event specification includes modifying the transmission modes or adding a new transmission mode.

9. The method of claim 6, wherein the updating the event specification includes spawning a new event whose content and communication mode are based on the event, the new event's content and communication mode generated based on the business rules and the analytics.

10. The method of claim 9, wherein the spawned new event's content includes a segment of the event's content.

11. The method of claim 9, wherein the spawned new event's communication mode comprises a subset of the event's transmission modes.

12. The method of claim 1, further including:
repeating the obtaining of the analytics, the obtaining of the event specification, wherein a dynamic event updating is provided based on the real-time analytics and the business rules.

13. The method of claim 1, wherein the analytics comprises at least modes and timing of communication determined from profile data of a recipient of the event.

14. The method of claim 1, wherein the analytics comprises a computational model of human behavior.

15. The method of claim 1, wherein the analytics are obtained dynamically in real time.

16. The method of claim 1, wherein the deploying the event is further based on monitoring of target base of the event at least via an RFID technique, wherein based on locations of the target base identified by the RFID technique, multiple messages associated with the event is sent to the target base via the two or more transmission modes, and based on the target base's changed location responsive to the multiple messages, it is determined which of the two or more transmission modes have higher impact on the target base, and switching to one of the two or more transmission mode that has the higher impact.

* * * * *